R. W. COUSINS.
ENGINE STARTING AND CURRENT GENERATING MECHANISM.
APPLICATION FILED JAN. 21, 1914.

1,115,903.

Patented Nov. 3, 1914.
5 SHEETS—SHEET 4.

Witnesses:
Inventor:
Robert W. Cousins,

UNITED STATES PATENT OFFICE.

ROBERT W. COUSINS, OF GARY, INDIANA.

ENGINE-STARTING AND CURRENT-GENERATING MECHANISM.

1,115,903.  Specification of Letters Patent.  Patented Nov. 3, 1914.

Application filed January 21, 1914. Serial No. 813,489.

*To all whom it may concern:*

Be it known that I, ROBERT W. COUSINS, a citizen of the United States, residing at Gary, in the county of Lake and State of Indiana, have invented a new and useful Improvement in Engine-Starting and Current-Generating Mechanism, of which the following is a specification.

My invention relates to improvements in electrical apparatus for starting internal combustion engines, of the type involving a motor for driving the engine, which also operates as a generator when driven from the engine.

My primary objects are to provide a simple and relatively inexpensive construction of apparatus for this purpose, which will require a relatively small motor-generator, and which will operate to automatically start the engine should it become stalled.

Referring to the accompanying drawings

Figure 1:
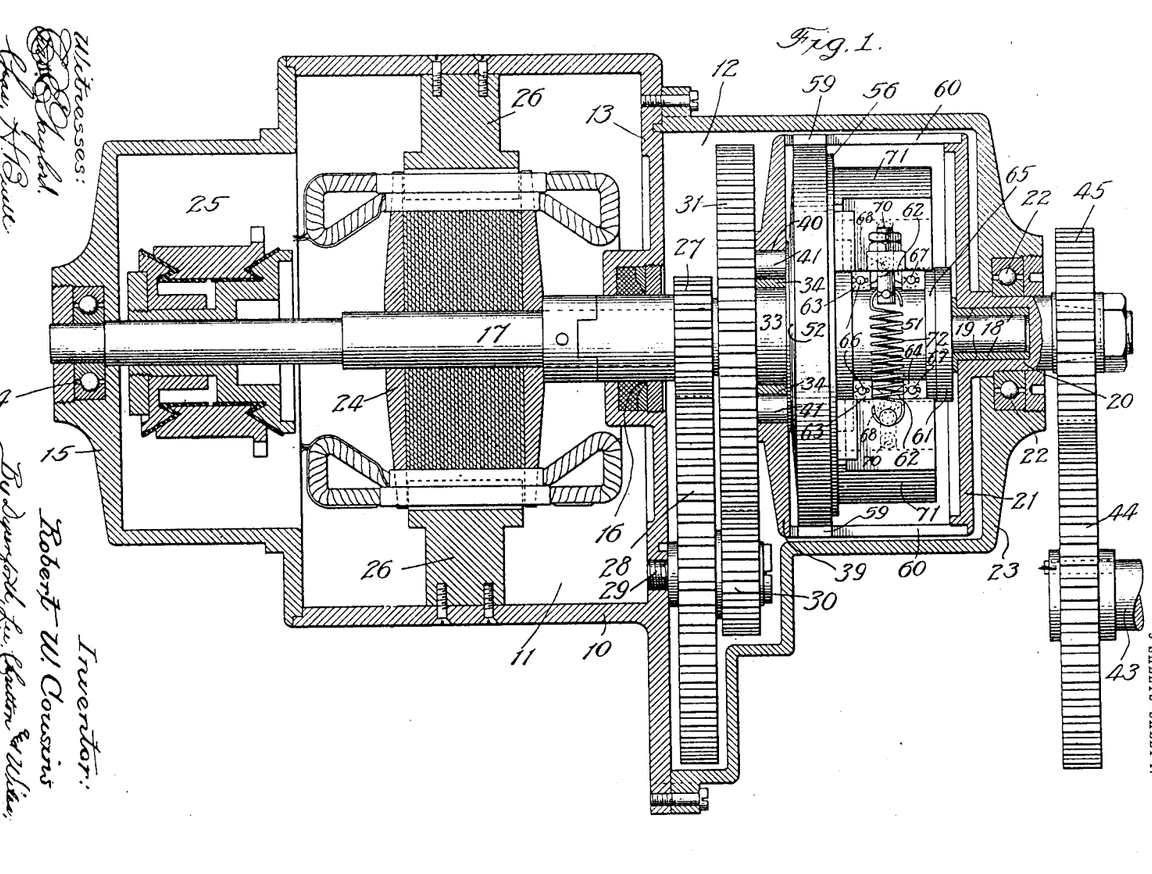
—Figure 1 is a view in vertical sectional elevation, partly in full elevation, of an electrical engine-starting apparatus constructed in accordance with my invention.
Figure 2:
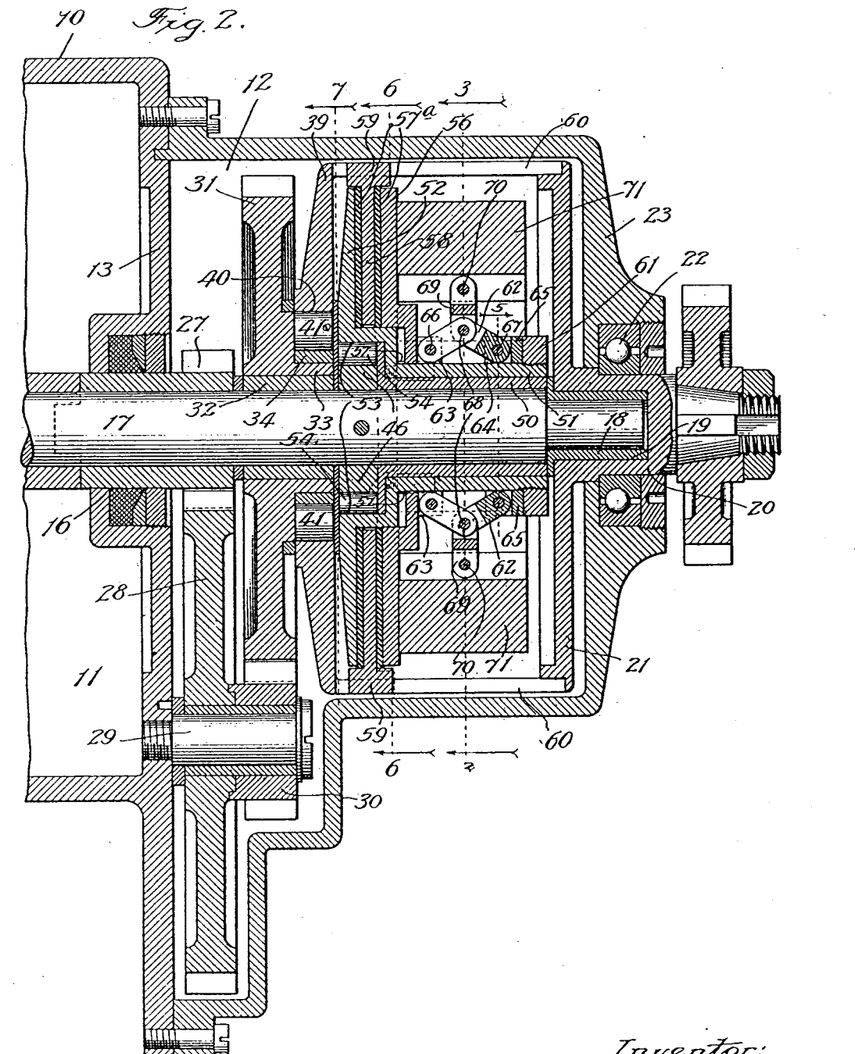
Fig. 2 is an enlarged view in vertical sectional elevation of the portion of the apparatus shown at the right-hand side of Fig. 1.
Figure 3:
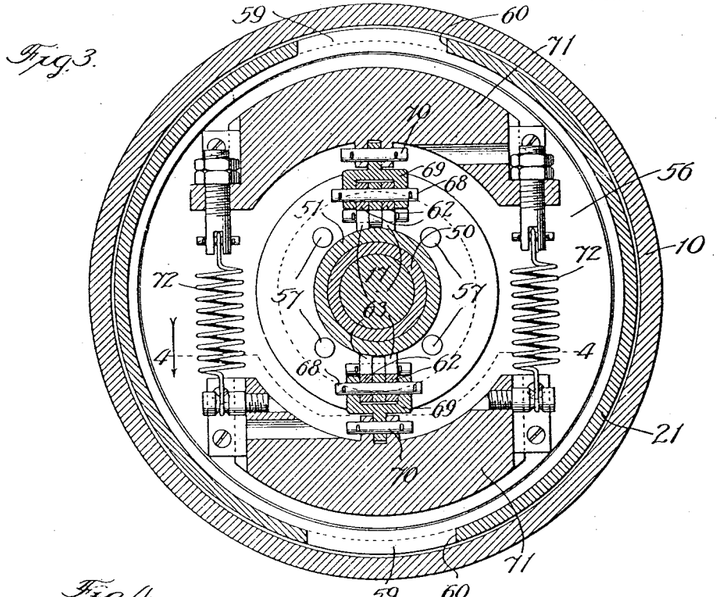
Fig. 3 is a section taken at the line 3 on Fig. 2, and viewed in the direction of the arrow.
Figure 4:
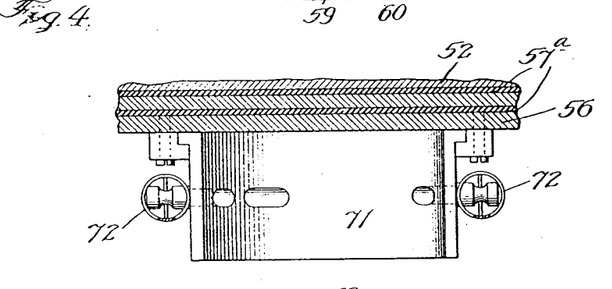
Fig. 4 is a section taken at the irregular line 4 on Fig. 3, and viewed in the direction of the arrow.
Figure 5:
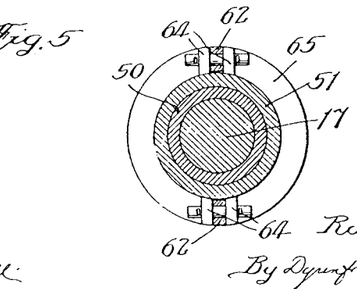
Fig. 5 is a section taken at the line 5 on Fig. 2, and viewed in the direction of the arrow.
Figure 7:
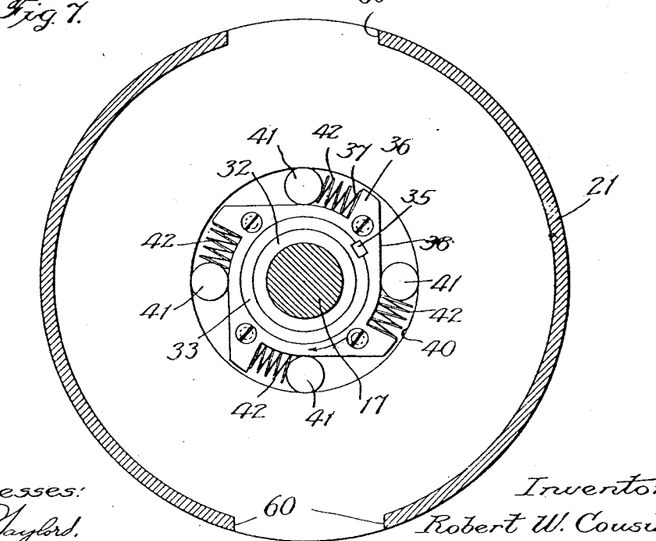

The casing of my improved apparatus is represented at 10, this casing being preferably divided into two compartments 11 and 12 by means of a partition 13, the compartment 11 housing the motor-generator hereinafter referred to, and the compartment 12 forming an oil-filled housing for the mechanism connecting the motor-generator with the shaft of the engine to be driven. Journaled at one end on ball bearings 14 in the end wall 15 of the casing, and between its ends in a stuffing box 16 in the partition 13, is a shaft 17, the opposite end of this shaft being journaled in a bushing 18 secured in a recess 19 in a stub-shaft 20 carried by a cage 21, and journaled on ball bearings 22 in the end wall 23 of the casing 10. The shaft 17 carries the armature 24 of the motor-generator and the commutator 25. The field winding of the motor-generator, which would be applied to the pole pieces 26, is omitted and in fact the motor-generator structure is illustrated more or less diagrammatically as any one of many motor-generators may be used in carrying out my invention provided it be of the shunt or compound type. Rigidly secured to the shaft 17 is a pinion 27 which meshes with a gear 28 journaled on a pin 29 secured in the partition 13, this gear carrying a pinion 30 which meshes with a gear 31 journaled on a sleeve 32 fixed on the shaft 17, the compound gearing thus provided operating to cause the gear 31 to be driven at a lower speed than that of the shaft 17 when driven from the latter. The gear 31 is equipped with a sleeve section 33 to which a ring 34 is keyed, as indicated at 35, this ring being provided at intervals about its periphery with lugs 36 presenting shoulders 37 and tangential inclined surfaces 38. The cage 21, journaled at the stub-shaft 20 in the casing at one end-wall 23, as hereinbefore described, contains in its opposite end wall 39 a circular opening 40 at which the cage 21 surrounds the sleeve 33 and lug-equipped ring 34, as clearly illustrated in Fig. 2. Located between adjacent lugs 36, and between the ring 34 and the wall of the opening 40, are rollers 41 between which and the shoulders 37 coiled springs 42 are positioned (Fig. 7), whereby when the gear 31 and ring 34 attached thereto are rotated in a clockwise direction in Fig. 7, the rollers 41 will ride upon the inclined surfaces 38, thus wedging the rollers 41 between these inclined surfaces and the wall of the opening 40, and driving the cage 21 in the same direction when the gear 31 is rotating faster than said cage under the conditions as hereinafter described. The cage 21, in carrying out my invention is connected with the shaft of the internal combustion engine with which my improved apparatus is to coöperate. In the construction illustrated, the engine shaft is represented at 43 and carries a gear 44 which meshes with a smaller gear 45 rigid on the stub-shaft 20 of the cage 21.

Figure 6:
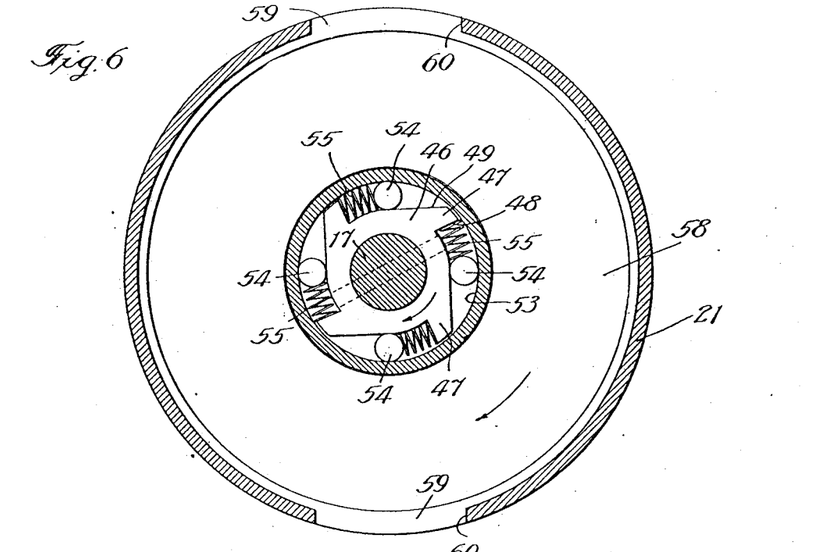
Figs. 6 and 7 are sections taken at the lines 6 and 7, respectively, on Fig. 2, and viewed in the direction of the arrows.

Rigid on the shaft 17, and located within the cage 21, is a ring 46 provided with lugs 47 on its periphery having shoulders and tangentially inclined surfaces 48 and 49, respectively, corresponding in construction with the lugs 36, hereinbefore described, the shoulders 48 and inclined surfaces 49, however, extending in a direction opposite to that in which the shoulders 37 and inclined surfaces 38 extend. Journaled on a bushing 50 on the shaft 17 is a sleeve 51 which carries a disk 52 provided with a circular recess 53 in an inset portion thereof at which the disk 52 surrounds the ring 46. Confined between the ring 46 and the circular wall of the recess 53 are rollers 54 which are backed up by springs 55 bearing against the shoulders 48 as explained of the springs 42. By the construction just described, the rollers 52 become wedged between the inclosed surfaces 49 and the inner wall of the recess 53 when the disk 52 is rotated in clockwise direction in Fig. 6 for driving the shaft 17. Surrounding the sleeve 51 is a disk 56 which is adapted to be moved toward and away from the disk 52 and is prevented from rotating independently of the disk 56 by stop pins 57 secured in the disk 52 and passing freely through the disk 56. The opposed faces of the disks 52 and 56 are covered with any suitable friction material 57a as, for example, chamois, and between these opposing faces an annular plate 58 is located, this plate carrying diametrically opposed flanges 59 on its periphery which project into longitudinally extending slots 60 in the side wall of the cage 21, whereby the plate 58 is caused to rotate with the cage 21, but is free to slide longitudinally therein. The end of the sleeve 51, opposite that carrying the disk 52, is provided with a flange 61 between which and the disk 56 toggles 62 are located, these toggles being connected at their opposite ends with lugs 63 and 64 on the disk 56, and a ring 65 surrounding the sleeve 51, respectively, as indicated at 66 and 67, whereby, upon operating the toggles 62, the disks 52 and 56 are drawn together to frictionally grip the plate 52 or spread apart to destroy the frictional engagement. The toggles 62, which are diametrically opposed, and are located on opposite sides of the sleeve 51, are connected at their center pivots 68 with links 69 which are pivotally connected, as indicated at 70, with blocks 71, these blocks being disposed at opposite sides of the sleeve 51, and connected together by springs 72, which tend to draw the blocks 71 together, and are under such tension that they will cause the disks 52 and 56, by reason of the straightening out of the toggles 62, to grip the plate 58 between these disks with sufficient friction to drive the plate 52 and the ring 46 and shaft 17 at the desired speed for operating the motor-generator hereinbefore described, as a generator.

It will be understood from the foregoing that, assuming the mechanism described to be at rest, rotation of the shaft 17 will drive the gear 31 at a speed less than that of the shaft 17, the reduced speed of this gear depending upon the degree to which it is stepped down by the interposed gearing. As soon as the gear 31 begins to revolve in clockwise direction in Fig. 7, it will cause the rollers 41 to become wedged between the inclined surfaces 38 and the wall of the opening 40, and thus drive the cage 21 from the gear 31 with the result of rotating the engine shaft 43, thus producing the desired rotation of the engine (not shown) for starting the engine. As soon as the engine starts to operate under its own power, it will accelerate the movement of the cage 21, causing the latter to rotate faster than the gear 31 which thus frees the shaft 17 of its load, whereupon the motor runs "light". The clutching means of which the rollers 54 form a part, and which have hereinbefore been described, are not brought into operation until the disk 52 is rotated, through the medium of the cage 21 and plate 58, at a speed greater than that at which the armature shaft 17 rotates as a motor, but just as soon as this speed is exceeded, the rollers 54 will become wedged between the surfaces 49 and the wall of the recess 53, whereupon the armature shaft 17 is driven from the cage 21 at a speed in excess of the speed at which this shaft runs when the motor-generator is operating as a motor, thus transforming the motor-generator into a generator.

It is desirable that the speed of the armature shaft 17 not exceed a predetermined number of revolutions, in order that this shaft, while being driven from the engine shall maintain a substantially constant speed, and to this end the governor mechanism, hereinbefore described, and formed of the sliding blocks 71 and the friction disks 115 and plates with the toggle connections between said plates, disks and blocks, is provided which operates to destroy the frictional grip between these disks and plates when the speed of the cage 21 exceeds that at which it is desired to drive the armature shaft 17. It will thus be seen, that during the time that the engine is operating to drive the cage 21 at a speed slightly in excess of that at which the gear 31 rotates, and up to the time that the engine drives the cage 21 at a speed in excess of the armature shaft 17, the shaft 17 is in effect disconnected from the engine and operates idly. In practice, it would be desirable to so proportion the gearing between the shaft 17 and gear 31, and that between the cage 21 and the engine shaft 43 as to cause the cage 21 to rotate at the same speed as the gear 31 when the engine is turning over at a relatively low speed as, for example, about that at which it is operated to start the engine, and to cause the cage 21 to rotate at about the same speed as the armature shaft 17 when the motor-generator is operating as a motor, when the engine is running under its own power at relatively low speed, as, for example, at a speed which would drive an automobile at say about eight miles an hour.

In order that the operation of my improved means may be clearly understood, I have chosen to illustrate it in connection with a desirable electrical circuit, and shall assume certain conditions which are sometimes met in practice.

As hereinbefore stated, the motor-generator may be either of the shunt type or compound type, the compound type being preferably employed where the engine, to be started by my improved apparatus, requires relatively great power for turning it over as in the case of a six cylinder engine. I shall assume that the motor-generator, when operating as a motor, will drive the shaft 17 at a maximum of twelve hundred revolutions per minute; that the gearing between the shaft 17 and the gear 31 is such as to cause the gear 31 to rotate one-eighth as fast as the shaft 17; and that the gears 44 and 45 cut down the speed of the cage 21 to one-third that of the engine shaft. The motor-generator will, therefore, operate as a generator when the shaft 17 is driven at a speed in excess of twelve hundred revolutions per minute, and it will be assumed that, under the assumptions above stated, the governor mechanism, hereinbefore described, will be so adjusted that it will release the engagement of the disk 52 with the plate 58 when the cage 21 exceeds thirteen hundred revolutions per minute.

Figure 8:
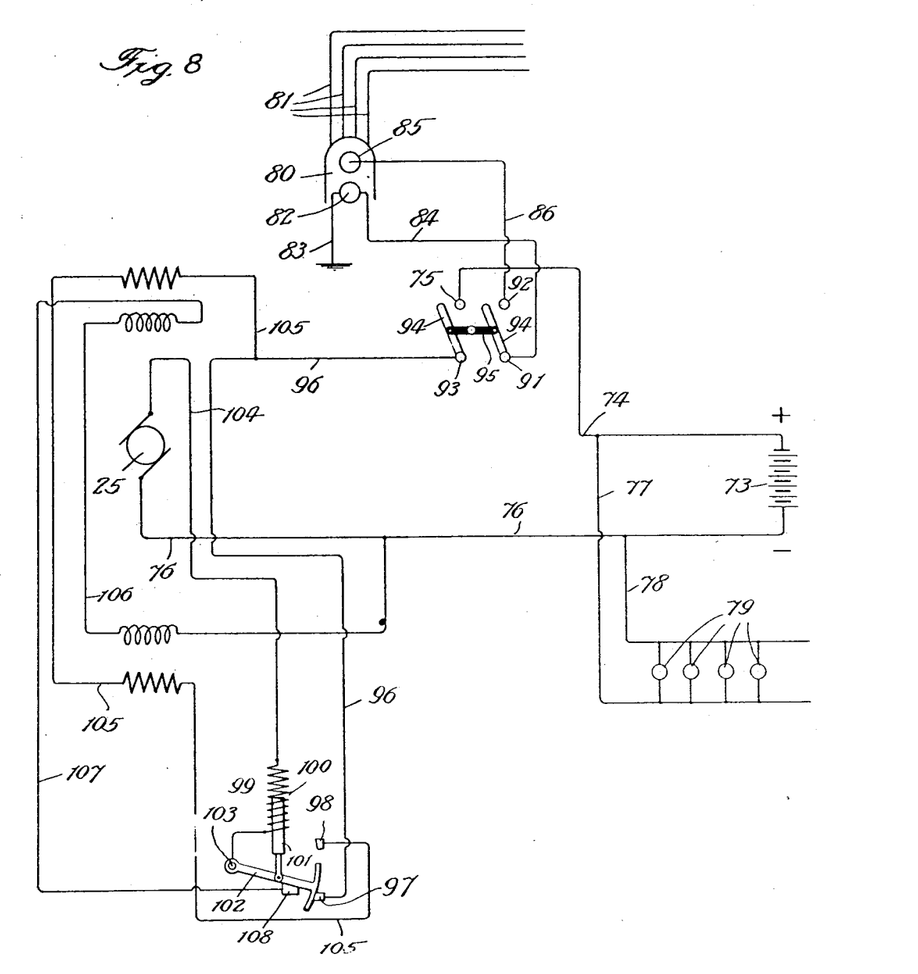
Fig. 8, a diagrammatic view of desirable electrical circuit connections where the motor-generator used is of the compound type and where it is to furnish electric current for operating electric lamps.

Following is a description of the circuit connections of my improved starting apparatus where a motor-generator of the compound type is employed, and where the motor-generator is to furnish electric current for operating electric lamps, a condition which is often met in practice in connection with automobiles. A storage battery is represented at 73, a wire 74 leading from one of the terminals of the storage battery to a binding post 75, and a wire 76 from the other terminal of the battery leading to one side of the commutator 25, wires 77 and 78 being connected with the wires 74 and 75, respectively, for furnishing current to lamps represented at 79 in parallel series. A magneto is diagrammatically represented at 80 having wires 81 leading therefrom to the spark plugs of the cylinders of the engine, four of these wires being shown. One side of the magneto-armature, represented at 82, is grounded through a wire 83, and the other side of this armature is connected with a wire 84 which connects with a contact 91. The distributer, represented at 85, is connected at one side through a wire 86 with a post 92, and at its other side with the wires 81. Another binding post is represented at 93, the posts 92 and 93 being connected with the metallic arms 94 of a switch 95 adapted to close the circuit between the contacts 91 and 92 and between the contacts 75 and 93. A wire 96 leads from the post 93 to a contact 97, the contact 97 forming with a contact 98 spaced therefrom, the contacts of a series relay 99 of common construction and involving a solenoid 100, the core 101 of which connects with a current-conducting arm 102 pivotally supported at 103, the arm 102 normally engaging with the contact 97, but movable out of engagement with this contact and into engagement with the contact 98 when the solenoid 100 is traversed by an electrical current of a certain predetermined intensity, engagement of the arm 102 with the contact 98 being made before the arm leaves the contact 97. A wire 104 connects with the commutator at the side opposite that at which the wire 76 is connected therewith, and connects with one end of the solenoid 100. The series field of the motor-generator is represented at 105, one end of this field being connected with the contact 98 and the other end thereof connected with the wire 96; and the shunt field of the motor is represented at 106, one end of the field being connected with a contact 108, engageable by the arm 102, by means of a wire 107 and the other end of this field being connected with the wire 76 intermediate the connector 25 and the battery 73.

Assuming the starter mechanism to be at rest, and the circuit devices shown in Fig. 8 to be in the position therein shown, the operator throws in the switch 95 to close the circuit between the contacts 91 and 92 and the contacts 75 and 93. This closes the magneto circuit and in addition causes current to pass from the battery 73, through the wire 74, contact 75, switch arm 94, contact 93, wire 96, contact 97, the series relay 99, wire 104, commutator 25 and wire 76 back to the battery 73, current also traversing the shunt field 106. The motor-generator immediately begins to operate, and through the medium of the gearing 27, 28, 30 and 31 drives the gear 31 and, through the clutch mechanism of which the rollers 71 form a part, as hereinbefore described, drives the cage 21, and through the medium of the gears 44 and 45 the engine shaft 43 thus "turning" over the engine which permits the engine to begin to operate under its own power. As soon as the solenoid 100 is energized, by the current traversing the circuit just described in the starting of the motor-generator, it lifts the arm 102 out of engagement with the contact 97 and into engagement with the contact 98 with the result of breaking the circuit through the shunt field 106 and establishing a circuit through the series field 105, which causes the motor-generator to operate as a series motor, thus obtaining the benefit of the increased torque produced by a series motor. The motor-generator continues to drive the engine shaft 43 until the engine has reached such a speed as will cause the cage 21 to rotate faster than the gear 31, which, in the case of the assumptions above made, would be over one hundred and fifty revolutions per minute. As soon as the cage 21 rotates faster than the gear 31, the load is taken off the shaft 17, and the latter operates as a motor idly in its bearings. As soon as the load is thus removed from the shaft 17, the current to the motor-generator from the battery 73 decreases to an amount sufficient only to run the motor "light", which so reduces the strength of the solenoid 100 as to cause the switch 102 to disengage from the contact 98 and engage with the contact 97, whereupon the series field 105 is broken and the shunt field 106 is established, the motor-generator thus operating as a shunt motor which prevents the acceleration of the armature beyond a certain predetermined speed, namely under the assumptions above stated, twelve hundred revolutions per minute. The shaft 17 continues to operate idly driven by the motor-generator as a motor by the current from the battery 73, until the engine in speeding up drives the cage 21 at a greater speed than that at which the armature shaft 17 is driven as a motor, namely when it exceeds twelve hundred revolutions. When the cage 21 exceeds twelve hundred revolutions, the disks 52 and 56, by frictionally engaging the plate 58, will cause the clutch mechanism, of which the rollers 54 are a part, to clutch the disk 52 to the ring 46, and therefore with the shaft 17, thus causing this shaft to be driven from the engine shaft at a speed in excess of that at which the shaft 17 operates when it is driven as a motor with the result of causing the motor-generator to operate as a shunt-wound generator instead of a motor, and thus charge the battery 73 and furnish current to the lamps 79.

It is highly advantageous to charge the battery 73 by means of constant voltage, and this I accomplish by providing the governor mechanism, hereinbefore referred to, which prevents the shaft 17 from being driven from the engine-shaft at a speed in excess of that required, which, under the assumed conditions hereinbefore stated, would be 1300 revolutions per minute, it being furthermore desirable that the speed at which the shaft 17 is driven from the engine be sufficient to cause the proper amount of current to be generated for furnishing the proper amount of current to the lamps 79 which, in the assumed case, would be 1300 revolutions per minute. Should the engine, in connection with which the starter is used, become stalled, as soon as the operator releases the clutch (not shown) which is universally employed for clutching the engine to the transmission, the motor-generator, being still in electrical connection with the battery 73, will immediately operate to drive the shaft 17 and again start the engine, as hereinbefore explained.

It will be noted that by my improved construction of starter, the motor merely serves to start the engine so that the latter may begin to operate under its own power, and is not forced to furnish power for driving the engine while the latter is running at speeds utilized for performing work, as, for example, driving the drive wheels of a car, which permits a motor of relatively small horse power to be used, but nevertheless of sufficient size to charge a storage battery of the desired size. Furthermore, the engine is not driven from the motor-generator through the governor, and thus the governor may be of such a construction as to render it relatively sensitive for insuring the driving of the shaft 17 from the engine at an approximately constant speed.

The feature of providing for the automatic engagement and disengagement of the engine shaft from the armature shaft 17, without breaking the electrical circuit in case the engine becomes stalled, is of very great advantage as it eliminates the necessity of the operator, through switches or push buttons, or the shifting of gears establishing the necessary electrical circuit for again starting the engine in case the latter becomes stalled, it being understood from the foregoing description that by my improved means the engine is automatically started as soon as the load on the stalled engine is removed, as, for example, by throwing the clutch not shown, but hereinbefore referred to.

What I claim as new and desire to secure by Letters Patent is—

1. In combination with an internal-combustion engine, engine-starting and current-generating means comprising a motor-generator, means for driving the shaft of the engine by said motor-generator, said means being automatically releasable by excess of speed of the engine-shaft beyond a predetermined speed, means operating automatically after release of said last-named means to drive said motor-generator shaft by said engine-shaft at a greater speed than that at which said motor-generator shaft, operates when said motor-generator is operating as a motor, and governor-means for limiting the speed of rotation of said motor-generator shaft when driven by said engine-shaft.

2. In mechanism of the character set forth, the combination of a motor-generator, a rotary member operatively connected with the shaft of said motor-generator, a second rotary member adapted to be operatively connected with the shaft of the engine to be started, means for driving said second rotary member from said first-named rotary member releasable by excess of speed of the engine-shaft beyond a predetermined speed, a third rotary member operatively connected with the shaft of said motor-generator, and means operating automatically after release of said first-named means to drive said motor-generator shaft by said second rotary member at a greater speed than that at which said motor-generator shaft operates when said motor-generator is operating as a motor.

3. In combination with an internal-combustion engine, engine-starting and current-generating means comprising a motor-generator, a rotary member, means for driving said rotary member from the shaft of said motor-generator at a reduced speed, means for driving the shaft of the engine by said rotary member, said last-named means being automatically releasable by excess of speed of the engine-shaft beyond a predetermined speed, means operating automatically after release of said last-named means to drive said motor-generator shaft by said engine-shaft at a greater speed than that at which said motor-generator shaft operates when said motor-generator is operating as a motor, and governor-means for limiting the speed of rotation of said motor-generator shaft when driven by said engine-shaft.

4. In mechanism of the character set forth, the combination of a motor-generator, a rotary member, means for driving said rotary member from the shaft of said motor-generator at a reduced speed, a second rotary member adapted to be operatively connected with the shaft of the engine to be started, means for driving said second rotary member from said first-named rotary member releasable by excess of speed of the engine-shaft beyond a predetermined speed, a third rotary member operatively connected with the shaft of said motor-generator, and means operating automatically after release of said first-named means to drive said motor-generator shaft by said second rotary member at a greater speed than that at which said motor-generator shaft operates when said motor-generator is operating as a motor.

5. In combination with an internal-combustion engine, engine-starting and current-generating means comprising a motor-generator, a rotary member, means for driving said rotary member from the shaft of said motor-generator at a reduced speed, means for driving the shaft of the engine by said rotary member, said last-named means being automatically releasable by excess of speed of the engine-shaft beyond a predetermined speed, a second rotary member driven from said motor-generator shaft at a greater speed than said first-named rotary member, means operating automatically to drive said second rotary member after release of said last-named means for driving said motor-generator shaft by said engine-shaft at a greater speed than that at which said motor-generator shaft operates when said motor-generator is operating as a motor, and governor-means for limiting the speed of rotation of said second rotary member when driven by said engine-shaft.

6. In combination with an internal-combustion engine, engine-starting and current-generating means comprising a motor-generator, a rotary member, means operated by the shaft of said motor-generator for driving said rotary member at a reduced speed, a second rotary member driven by said motor-generator shaft at a greater speed than said first-named rotary member, a third rotary member operatively connected with the shaft of said engine, means for driving said third rotary member by said first-named rotary member, said last-named means being automatically releasable by excess of speed of the engine-shaft beyond a predetermined speed, means connected with said third rotary member and rotatable at uniform speed therewith operating automatically after release of said engine-shaft driving means to drive said motor-generator shaft by said engine-shaft, through said second rotary member, at a greater speed than that at which said motor-generator shaft operates when said motor-generator is operating as a motor, and governor-means for limiting the speed at which said third rotary member drives said second rotary member.

7. In combination with an internal-combustion engine, engine-starting and current-generating means comprising a motor-generator, a rotary member, means for driving said rotary member from the shaft of said motor-generator at a reduced speed, means for driving the shaft of the engine by said rotary member, said means being automatically releasable by excess of speed of the engine-shaft beyond a predetermined speed, a second rotary member fixed on said motor-generator shaft, means operating automatically after release of said last-named means to drive said second rotary member by said engine-shaft at a greater speed than that at which said motor-generator shaft and said second rotary member operate when said motor-generator is operating as a motor, and governor-means for limiting the speed of rotation of said second rotary member when driven by said engine-shaft.

8. In mechanism of the character set forth, the combination of a motor-generator, a rotary member, means operatively connecting said rotary member with the shaft of said motor-generator for rotating said member at a slower speed than said shaft, a second rotary member adapted to be operatively connected with the shaft of the engine to be started, a third rotary member operatively connected with said motor-generator shaft to rotate faster than said first-named rotary member, automatically operating means for driving said second rotary member from said first rotary member automatically releasable by excess of speed of said second rotary member beyond that at which said first rotary member is driven from said motor-generator shaft when said motor-generator is operating as a motor, automatically operating means for driving said third rotary member from said second rotary member when the latter is driven from said engine shaft at a greater speed than that at which said third rotary member is driven from said motor-generator when the latter is operating as a motor, and governor-means for limiting the speed at which said third rotary member drives said second rotary member.

9. In mechanism of the character set forth, the combination of a motor-generator, a rotary member, means operatively connecting said rotary member with the shaft of said motor-generator for rotating said member at a slower speed than said shaft, a second rotary member adapted to be operatively connected with the shaft of the engine to be started, a third rotary member operatively connected with said motor-generator shaft to rotate faster than said first-named rotary member, automatically operating means for driving said second rotary member from said first rotary member automatically releasable by excess of speed of said second rotary member beyond that at which said first rotary member is driven from said motor-generator shaft when said motor-generator is operating as a motor, automatically operating means for driving said third rotary member from said second rotary member when the latter is driven from said engine shaft at a greater speed than that at which said third rotary member is driven from said motor-generator when the latter is operating as a motor, and governor-means for limiting the speed of rotation of said motor-generator shaft when driven from said engine-shaft.

10. In mechanism of the character set forth, the combination of a motor-generator, a gear geared to the shaft of said motor-generator to rotate at a reduced speed, a rotary member adapted to be operatively connected with the drive shaft of the engine, means for releasably clutching said gear to said rotary member, a second rotary member operatively connected with said motor-generator shaft and rotating faster than said gear, automatically operating means for clutching said first-named rotary member to said second rotary member when the speed of said first rotary member exceeds the speed of said second rotary member when the latter is driven from said motor-generator shaft while the latter is operating as a motor, and governor-means for limiting the speed at which said first-named rotary member drives said second rotary member.

11. In mechanism of the character set forth, the combination of a motor-generator, a gear geared to the shaft of said motor-generator to rotate at a reduced speed, a rotary member adapted to be operatively connected with the drive-shaft of the engine, means for releasably clutching said gear to said rotary member, a second rotary member operatively connected with said motor-generator shaft and rotating faster than said gear, automatically operating means for clutching said first-named rotary member to said second rotary member when the speed of said first rotary member exceeds the speed of said second rotary member when the latter is driven from said motor-generator shaft while the latter is operating as a motor, and governor-means for limiting the speed at which said second rotary member rotates when being driven from said first-named rotary member.

12. In mechanism of the character set forth, the combination of a motor-generator, a rotary member operatively connected with the shaft of said motor-generator, a second rotary member operatively connected with said motor-generator shaft and driven therefrom at a greater speed than said first named rotary-member, a third rotary member adapted to be operatively connected with the shaft of the engine to be started, oppositely operating clutch mechanisms for clutching said third rotary member with said first and second rotary members, respectively, and governor-means for limiting the speed at which said third rotary member drives said second rotary member, for the purpose set forth.

13. In mechanism of the character set forth, the combination of a motor-generator, a rotary member operatively connected with the shaft of said motor generator, a second rotary member operatively connected with said motor-generator shaft and driven therefrom at a greater speed than said first-named rotary member, a third rotary member adapted to be operatively connected with the shaft of the engine to be started, roller clutch mechanisms for clutching said third rotary member with said first and second rotary members, respectively, and governor-means for limiting the speed at which said third rotary member drives said second rotary member, for the purpose set forth.

14. In mechanism of the character set forth, the combination of a motor-generator, a rotary member operatively connected with the shaft of said motor-generator, a second rotary member operatively connected with said motor-generator shaft and driven therefrom at a greater speed than said first-named rotary member, a third rotary member adapted to be operatively connected with the shaft of the engine to be started, independently operating clutch mechanisms for clutching said third rotary member with said first and second rotary members, respectively, and governor-means for limiting the speed at which said third rotary member drives said second rotary member, for the purpose set forth.

15. In mechanism of the character set forth, the combination of a motor-generator, a rotary member operatively connected with the shaft of said motor-generator, a second rotary member operatively connected with said motor-generator shaft and driven therefrom at a greater speed than said first-named rotary member, a third rotary member adapted to be operatively connected with the shaft of the engine to be started, independently operating clutch mechanisms for clutching said third rotary member with said first and second rotary members, respectively, and governor-means carried by said third rotary member and controlling the speed at which said third rotary member drives said second rotary member, for the purpose set forth.

16. In mechanism of the character set forth, the combination of a motor-generator, a rotary member operatively connected with the shaft of said motor-generator, a second rotary member operatively connected with said motor-generator shaft and driven therefrom at a greater speed than said first-named rotary member, a third rotary member adapted to be operatively connected with the shaft of the engine to be started, automatically releasable means connecting said third rotary member with said first-named rotary member, a pair of opposed rotatable disks mounted to be moved toward and away from each other, automatically releasable means for engaging one of said disks with said second rotary member, a member operatively connected with said third rotary member and rotatable therewith, said last-named member being interposed between said disks, and governor-means operating to releasably hold said disks and interposed member in frictional engagement, for the purpose set forth.

17. In mechanism of the character set forth, the combination of a motor-generator, a rotary member operatively connected with the shaft of said motor-generator, a second rotary member operatively connected with said motor-generator shaft and driven therefrom at a greater speed than said first-named rotary member, a third rotary member adapted to be operatively connected with the shaft of the engine to be started, automatically releasable means connecting said third rotary member with said first-named rotary member, a pair of opposed rotatable disks mounted to be moved toward and away from each other, automatically releasable means for engaging one of said disks with said second rotary member, a member operatively connected with said third rotary member and rotatable therewith, said last-named member being interposed between said disks, means tending to move said disks toward each other for frictionally engaging said interposed member, including means operating under the action of centrifugal force to separate said disks, for the purpose set forth.

18. In mechanism of the character set forth, the combination of a motor-generator, a rotary member operatively connected with the shaft of said motor-generator, a second rotary member operatively connected with said motor-generator shaft and driven therefrom at a greater speed than said first-named rotary member, a rotatable cage adapted to be operatively connected with the shaft of the engine to be started, automatically releasable means connecting together said first-named rotary member and said cage, automatically releasable means in, and connected with, said cage for connecting together said cage and said second rotary member, and governor-means for controlling the speed of said second rotary member relative to said cage during the operation of the engine under its own power.

19. In mechanism of the character set forth, the combination of a motor-generator, a gear journaled on the shaft of the motor-generator, means for driving said gear from said motor-generator shaft at a reduced speed, a ring rigid on said motor-generator shaft, a rotary cage adapted to be connected with the shaft of the engine to be started, means for releasably clutching said cage to said gear, automatically releasable clutching means interposed between said ring and cage for driving said ring and motor-generator shaft from said cage, and governor-means for controlling the speed of said ring relative to said cage during the operation of the engine under its own power.

20. In mechanism of the character set forth, the combination of a motor-generator, a gear journaled on the shaft of said motor-generator, means for driving said gear from said motor-generator shaft at a reduced speed, a rotary cage adapted to be operatively connected with the shaft of the engine to be started, roller clutch mechanism interposed between said gear and cage and operating to clutch said gear and cage together until the speed of said cage, when driven from the engine, exceeds that at which said gear rotates when said motor-generator is operating as a motor, a ring rigid on said motor-generator shaft, a pair of rotatable disks in said cage movable toward and away from each other, a member in said cage and rotatable therewith, but movable longitudinally thereof, interposed between said disks and adapted to frictionally engage them for driving said disks from said cage, roller clutch mechanism interposed between one of said disks and said ring operating to clutch said last-referred-to disk to said ring when the speed of said cage, when driven from said engine-shaft, exceeds the speed at which said ring is driven when said motor-generator is operating as a motor, and governor-means operatively engaging with said disks and operating to control the speed of rotation of the latter relative to that of said cage.

21. In combination with an internal-combustion engine, engine-starting and current-generating means comprising a motor-generator, a rotary member, means for driving said rotary member from the shaft of said motor-generator at a reduced speed, means for driving the shaft of the engine by said rotary member, said last-named means being automatically releasable by excess of speed of the engine-shaft beyond a predetermined speed, a second rotary member operatively connected with said motor-generator shaft, means operating automatically to drive said second rotary member after release of said last-named means for driving said motor-generator shaft by said engine-shaft at a greater speed than that at which said motor-generator shaft operates when said motor-generator is operating as a motor, and governor-means for limiting the speed of rotation of said second rotary member when driven by said engine-shaft.

22. In combination with an internal-combustion engine, engine-starting and current-generating means comprising a motor-generator, a rotary member, means operated by the shaft of said motor-generator for driving said rotary member at a reduced speed, a second rotary member operatively connected with said motor-generator shaft, a third rotary member operatively connected with the shaft of said engine, means for driving said third rotary member by said first-named rotary member, said last-named means being automatically releasable by excess of speed of the engine-shaft beyond a predetermined speed, means connected with said third rotary member and rotatable at uniform speed therewith operating automatically after release of said engine-shaft driving means to drive said motor-generator shaft by said engine-shaft, through said second rotary member, at a greater speed than that at which said motor-generator shaft operates when said motor-generator is operating as a motor, and governor-means for limiting the speed at which said third rotary member drives said second rotary member.

23. In mechanism of the character set forth, the combination of a motor-generator, a gear carried to the shaft of said motor-generator to rotate at a reduced speed, a rotary member adapted to be operatively connected with the drive-shaft of the engine, means for releasably clutching said gear to said rotary member, a second rotary member operatively connected with said motor-generator shaft and operating when driven to rotate at the speed of said last-referred to shaft, automatically operating means for clutching said first-named rotary member to said second rotary member when the speed of said first rotary member exceeds the speed of said second rotary member when the latter is driven from said motor-generator shaft while the latter is operating as a motor, and governor-means for limiting the speed at which said first-named rotary member drives said second rotary member.

24. In mechanism of the character set forth, the combination of a motor-generator shaft, a rotary member operatively connected with the shaft and driven therefrom at a reduced speed, a second rotary member operatively connected with said motor-generator shaft, a third rotary member adapted to be operatively connected with the shaft of the engine to be started, oppositely operating clutch-mechanisms for clutching said third rotary member with said first and second rotary members, respectively, and governor-means for limiting the speed at which said third rotary member drives said second rotary member.

25. In mechanism of the character set forth, the combination of a motor-generator, a rotary member operatively connected with the shaft of said motor-generator and driven from the latter at a reduced speed, a second rotary member operatively connected with said motor-generator shaft, a third rotary member adapted to be operatively connected with the shaft of the engine to be started, automatically releasable means connecting said third rotary member with said first-named rotary member, a pair of opposed rotatable disks mounted to be moved toward and away from each other, automatically releasable means for engaging one of said disks with said second rotary member, a member operatively connected with said third rotary member and rotatable therewith, said last-named member being interposed between said disks, and governor means operating to releasably hold said disks and interposed member in frictional engagement, for the purpose set forth.

26. In mechanism of the character set forth, the combination of a motor-generator, a rotary member operatively connected with the shaft of said motor-generator, for driving said member at a reduced speed, a second rotary member operatively connected with said motor-generator shaft, a third rotary member adapted to be operatively connected with the shaft of the engine to be started, automatically releasable means connecting said third rotary member with said first-named rotary member, a pair of opposed rotatable disks mounted to be moved toward and away from each other, automatically releasable means for engaging one of said disks with said second rotary member, a member operatively connected with said third rotary member and rotatable therewith, said last-named member being interposed between said disks, and means tending to move said disks toward each other for frictionally engaging said interposed member including means operating under the action of centrifugal force to separate said disks, for the purpose set forth.

27. In mechanism of the character set forth, the combination of a motor-generator, a rotary member operatively connected with the shaft of said motor-generator for driving said rotary member at a reduced speed, a second rotary member operatively connected with said motor-generator shaft, a rotatable cage adapted to be operatively connected with the shaft of the engine to be started, automatically releasable means connecting together said first-named rotary member and said cage, automatically releasable means in, and connected with, said cage for connecting together said cage and said second rotary member, and governor-means for controlling the speed of said second rotary member relative to said cage during the operation of the engine under its own power.

ROBERT W. COUSINS.

In presence of—
 ANDREW A. STEWART,
 MARTIN WALLIN.